United States Patent

Soriano et al.

[11] Patent Number: 5,519,937
[45] Date of Patent: May 28, 1996

[54] GUIDING METHOD AND DEVICE FOR THE AUTOMATIC INTRODUCTION OF A MALE PIECE INTO A FEMALE PIECE

[76] Inventors: Louis Soriano, Chemin de Riquet, Aubagne, France; Bruno Daugy, Chemin de Bernes, Saint Maximin, France

[21] Appl. No.: 469,799

[22] Filed: Jun. 6, 1995

Related U.S. Application Data

[63] Continuation of Ser. No. 64,029, May 14, 1993, abandoned.

[30] Foreign Application Priority Data

Nov. 14, 1990 [FR] France .................... 90 14480

[51] Int. Cl.$^6$ .................... H01R 9/00; B23P 19/00; B23P 21/00
[52] U.S. Cl. .................... 29/842; 29/709; 29/714; 29/739
[58] Field of Search .................... 29/709, 714, 739, 29/842, 844, 845; 901/14

[56] References Cited

U.S. PATENT DOCUMENTS 4,707,907 11/1987 Ivanov .................... 29/821

FOREIGN PATENT DOCUMENTS 2644379 1/1989 France .
1761426 9/1992 U.S.S.R. .................... 29/821
8805967 11/1988 WIPO .

OTHER PUBLICATIONS

Netherlands, Polytechnisch Tijdschrift, Werktuigbouw, vol. 35, No. 11, pp.643–653; Prof. dr. ir. H. VanBrussel:"Gebruik van sensoren bij industriele robots" Nov. 1980.

Antwerp, Belgium Journal A: vol. 23, No. 3 pp. 114–125; J. G. van den Hanenberg: "An experimental assembly robot" Jul. 1991.

Primary Examiner—P. W. Echols

[57] ABSTRACT

The present invention relates to a guiding method and device for the automatic introduction of a male piece into a female piece. The pieces are of general cylindrical or prismatic shape of given axis and are mounted on supports permitting their displacement with respect to each other according to three orthonormal axes of translation, one of which is parallel to axis and constitutes the introduction axis. The male piece is mounted so as to be flexible in rotation about two other axes with respect to its support and the device comprises a guide for guiding in relative movement and along a plane perpendicular to the introduction axis above the socket of the female piece, so as to cover part of the opening thereof, and when the male piece is brought into abutment against said guide, the piece is inclined of a predetermined angle.

18 Claims, 3 Drawing Sheets

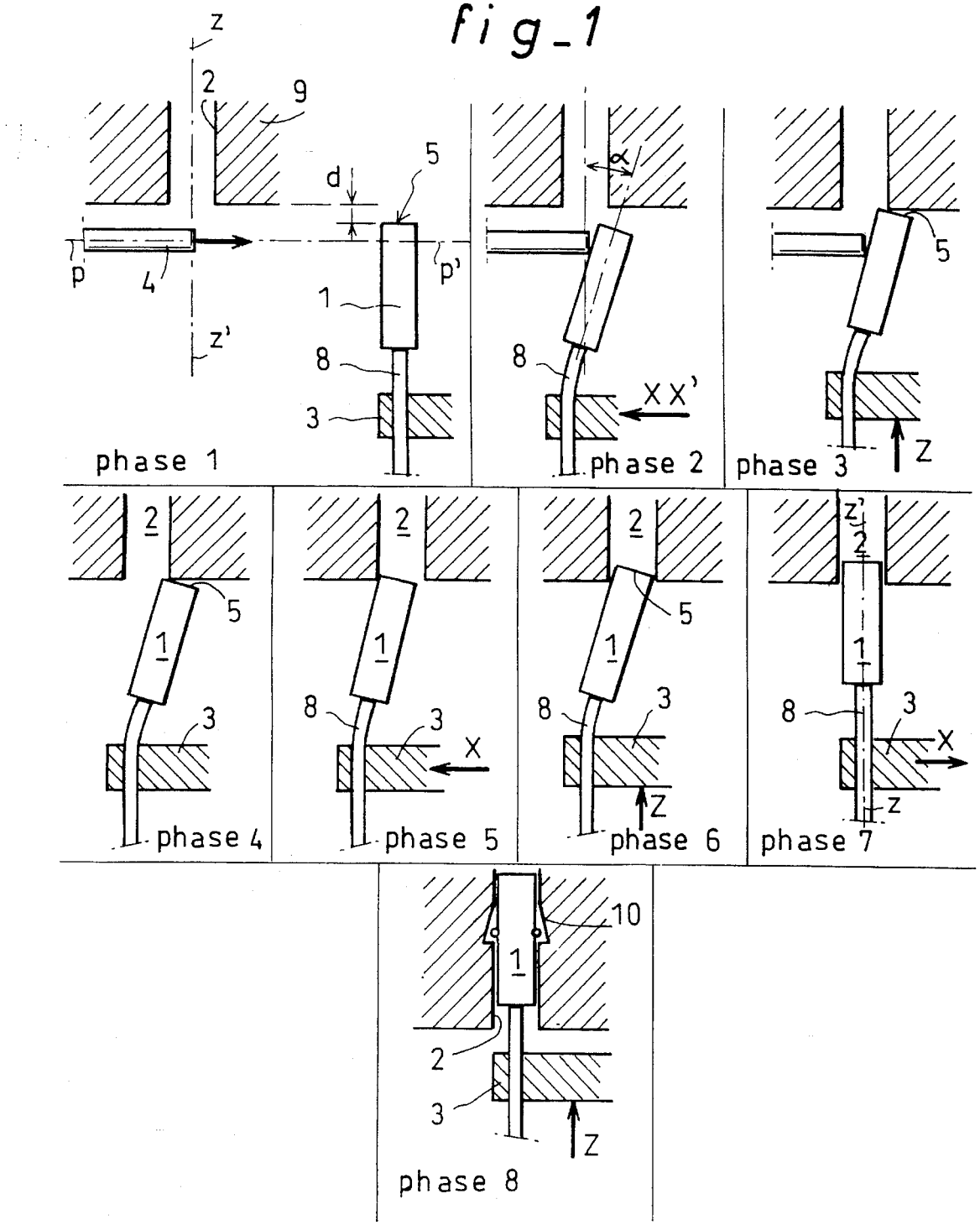

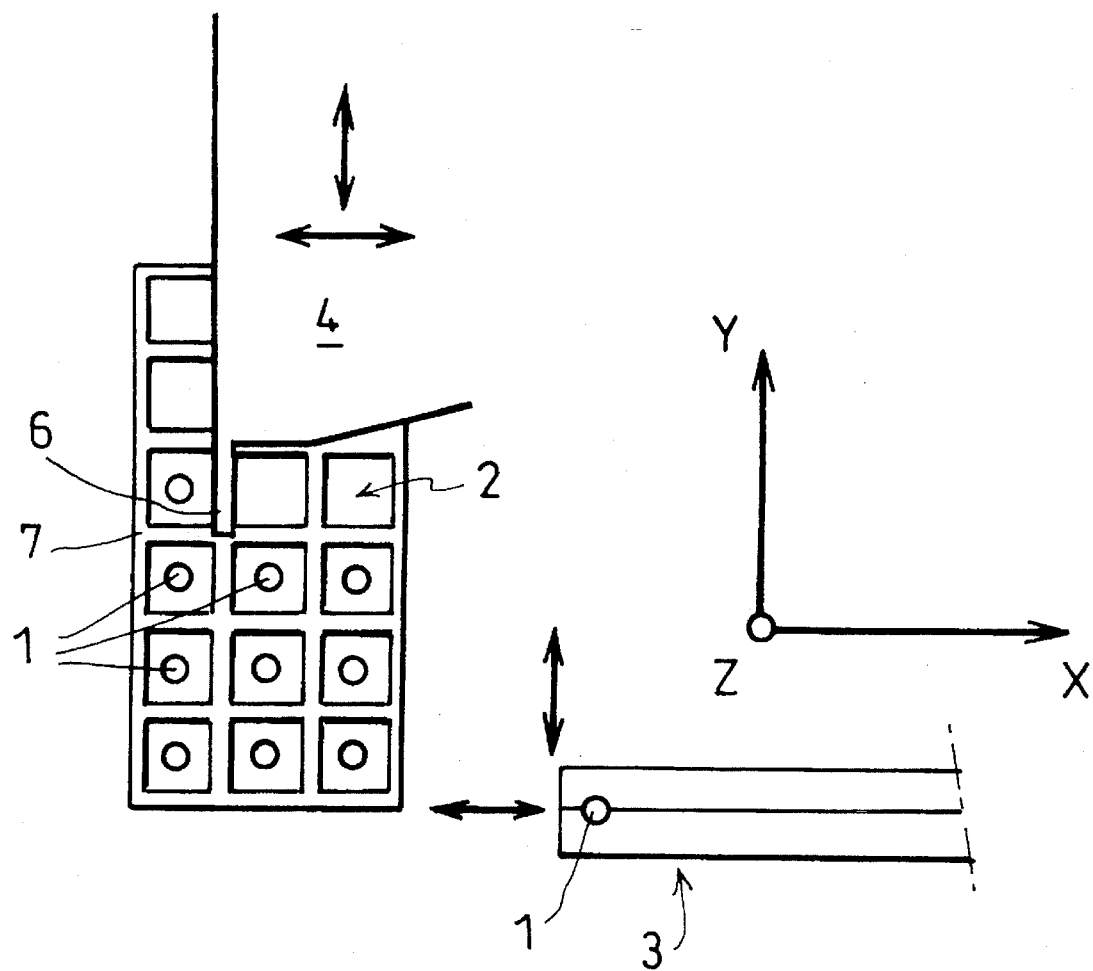
fig_2

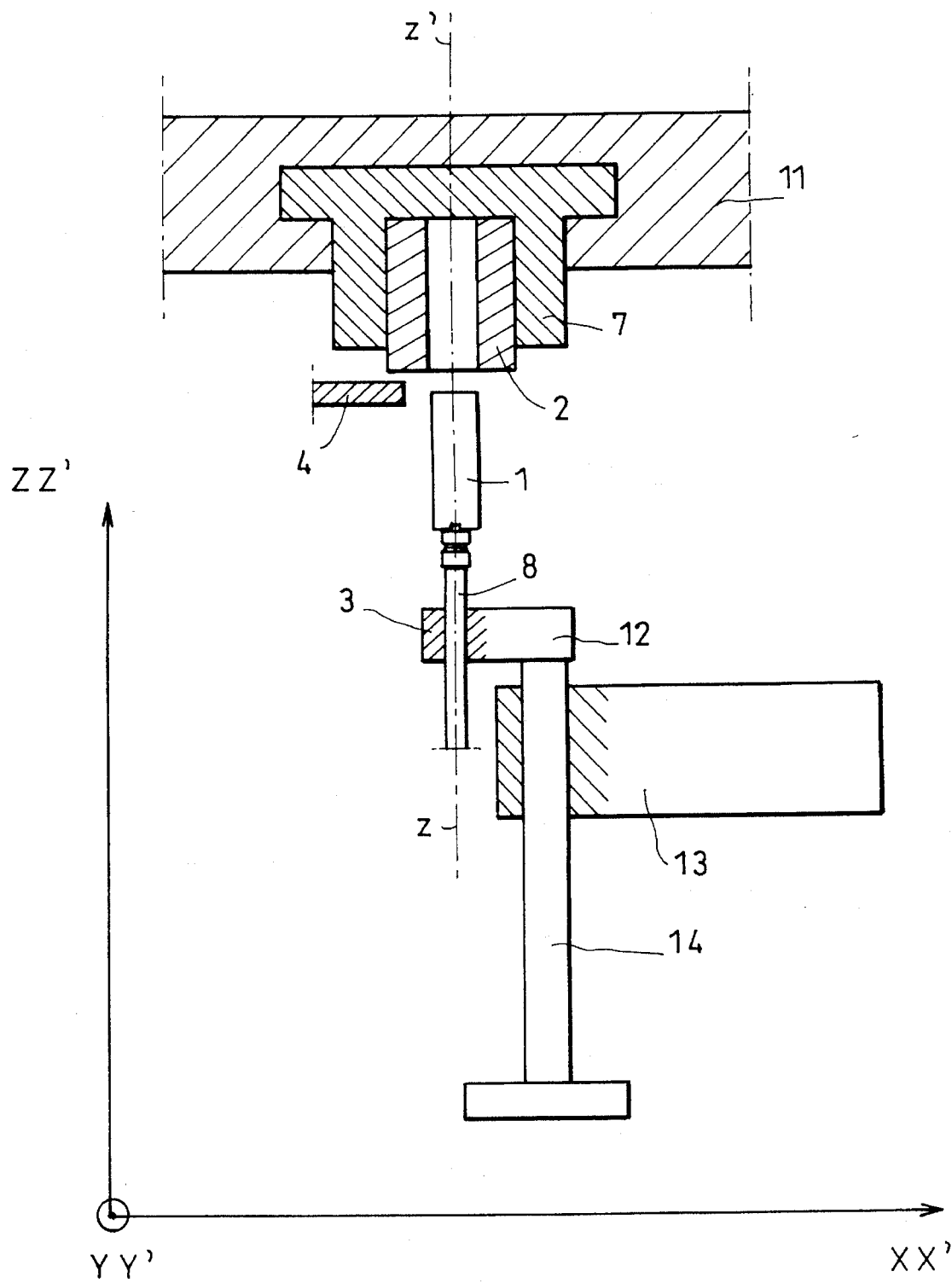
fig_3

GUIDING METHOD AND DEVICE FOR THE AUTOMATIC INTRODUCTION OF A MALE PIECE INTO A FEMALE PIECE

This application is a continuation of application Ser. No. 08/064,029, filed as PCT/FR91/00893, Nov. 14, 1991, published as WO92/09124, May 29, 1992, now abandoned.

DESCRIPTION

The present invention relates to a guiding method and device for the automatic introduction of a male piece into a female piece.

The technical sector of the invention is that of the construction of automatic machines for connecting male pieces in female pieces.

One of the main applications of the invention is the production of robots for connecting bundles of wires of which one or the two ends are equipped with connection pieces and which are inserted in the sockets of insulating cases, or on connector terminals or electrical apparatus terminals.

This application is not restrictive, and the methods and devices according to the invention apply to all cases where male pieces have to be mechanically inserted into female pieces, into which they penetrate with very little play and where said male pieces have characteristics of flexibility such as described in the present application.

However, for clarity's sake, the application referred to and illustrated by way of example in the description of the present invention, is specific to wiring robots, in which the term "connection" is uniformly used for designating the male piece, and the term "socket" for designating the female piece.

It is indeed known that the mechanical insertion of male connection pieces into female connection pieces raises problems when there is only a small amount of play between said pieces, and this is of course the case with electrical connections, since even then, the small amount of play existing during the insertion has to disappear in the connection position in order to ensure electrical conduction.

The small amount of play present during insertion makes it necessary for the two pieces to be in perfect alignment prior to preparation and before being brought closer together and permanently inserted one into the other.

In practice, the alignment is seldom perfect, even if the axes of the female piece and of the male piece are parallel, they may be offset one with respect to the other. The axes of the two pieces may also present a defective parallelism. These two defects are often concurrent.

The value of the distance and the direction of shifting of the axes as well as the value and direction of the phase angle between the axes vary at random and are not individually known.

For example, the relative position of the socket or female piece and of the connection piece or male piece is often known only with a degree of uncertainty greater than the play between the connection and socket.

Because of this small amount of play available between the two pieces to be inserted one into the other, it may happen that an alignment defect causes a relative displscement of the end of the male piece with respect to the opening of the female piece which is greater than the play: in such a case, when the male piece is brought closer to the female piece, the front face of the male piece abuts frontally against the edges of the opening of the female piece and cannot penetrate into the latter; then the automatic insertion device stops automatically, thus stopping the operation of the wiring machine, or it continues to press forward, thus causing a deformation of the piece to be inserted with possible damage to the insertion device.

In order to overcome this drawback, many manufacturers and inventors have proposed various systems, the simplest and best known of which consists in placing in front of the socket or female piece, a funnel-shaped guide in order to guide the male piece by a sliding movement against the walls of the funnel: however, the great disadvantage with this solution is that it requires an accuracy of position between the funnel and the female piece which is precisely less than the play between said piece and the connection, this being in fact equivalent to shifting the initial problem with two other pieces, unless these are fixed rigidly together beforehand, which complicates matters; other disadvantages of this solution are its limitation in not allowing the adjustment of the great differences in position, and the necessity to use specific funnel-shaped guides for each shape, such as for each different diameter.

Accordingly, other solutions have been developed, some of which have been the subject of patent applications: for example, the French patent application No. 2 640 826 filed on Dec. 19, 1988 by Messrs. BRICAUD and LESCOURT, for a "cutting, inserting and crimping tool for electrical connectors with displacement of insulating material", comprising a finger for moving the connector longitudinally forward in stepwise fashion, which finger is received in the socket opposite a slide block and penetrates therein as far as a certain zone, and means for lateral retraction of this finger in order to allow the insertion of the wire into the socket.

Other such patent applications are French patent applications No. 2 618 953 of Jul. 31, 1987 and No. 2 644 379 Jan. 27, 1989 filed by Mr. Claude RICARD for methods and devices for automatically inserting, respectively, for the first application "electrical connection pieces into sockets", and for the second application, "a male piece into a female piece". The object of the first application is to solve, after insertion, the problems of positioning along the axis of the connection, by controlling the good mechanical strength of the latter, thanks to a shoulder piece and two flanges, but without any mention of the problem of the axes shifting when the pieces are introduced; as to the second application, this effectively aims at solving this last problem which is also the concern of the present invention, thanks to a controlled inclination along one or two axes of the support of the male piece, which latter is then inserted slantwise through the resulting angle formed at its end into the female piece, before bringing it in abutment against a wall thereof and then straightening up the assembly and achieving complete insertion.

A more complex variant of this last method is also found in Dutch patent application NL 7901956 filed on Mar. 12, 1979 by the company LEUVEN RESEARCH & DEVELOPMENT, using essentially force meters combined with complex calculations to adapt the displacements with the reverse forces of the pieces one with respect to the other.

All the above-referred solutions and many others are either unsuitable or complex because they particularly require pieces gripping systems capable of displacement and rotation in all directions, which, on the one hand, make the mechanical devices of the robot heavy and also complicates its control and programming, and on the other hand, which precisely causes risks of more play in the relative positions.

It is therefore the object of the present invention to provide means permitting the automatic insertion of a male piece into a female piece in which it is expected to penetrate with only very little play, as long as, on the one hand, the front end of the male piece cannot abut frontally too strongly and jam the mechanism, and/or damage itself against the edges of the opening of the female piece if the two pieces are not in perfect alignment, and on the other hand, without the need for a complex force measuring system or for a mechanical displacement device having more than three degrees of freedom in rotation and in translation, for presenting the parts one with respect to the other.

Another object of the present invention is to provide the possibility of producing a mechanical guiding and insertion device from pieces having no more than two degrees of freedom in translation, and at best only one to simplify the design of the device.

These objects are attained with a guiding method for the automatic introduction of a compatible male piece into a female piece of general cylindrical or prismatic shape of given axis, the two pieces being mounted on supports and a set of means being provided for moving the two pieces with respect to each other according to three orthonormal axes of translation, one of which is parallel to that of the female piece and constitutes the axis of introduction, according to which method:

said flexible male piece is mounted for rotating about two other axes with respect to its support;

a guide is brought according to a relative movement and to a plane perpendicular to the introduction axis above the socket of the female piece, so as to cover part of the opening thereof;

the two male and female pieces are brought closer together, following the direction of the introduction axis, up to a given distance, such that the end of the male piece meets the plane of the guide, then, by a translatory movement according to one of the axes perpendicular to the introduction axis, said end is brought in abutment against the guide, in such a way that the male piece is inclined a predetermined angle;

the support and the male piece are moved again along the introduction axis so as to bring the end in frontal abutment against the edge of the socket, and then the guide is retracted;

the support and the male piece are translated according to the same axis perpendicular to the introduction axis as in the first translation, until the end of said male piece is brought in lateral abutment against the edge of the socket;

the support and the male piece are moved along the introduction axis until said piece reaches a predetermined position in the female piece or is wedged therein, and the support is brought back along said perpendicular axis so as to bring the theoretical axes of introduction of the male and female pieces in coinciding position;

the support is translated again according to the axis of introduction in order to insert the male piece completely into the socket.

In a preferred embodiment of the method according to the invention, the same operations as above are performed, effecting simultaneously and successively, for each translation according to the selected axis perpendicular to the introduction axis, the same translation according to the axis which is perpendicular to the first axis selected in the same control plane as the plane of the guide.

The results of the invention are therefore new guiding methods and devices for the automatic introduction of a male piece into a female piece.

Said associated methods and devices have indeed been found to eliminate the various drawbacks cited hereinabove and encountered in the existing systems; they, in fact, permit the connection of female pieces and male pieces with supports and means of insertion which can only perform translatory movements; moreover, the risks of the pieces to be connected becoming wedged in or damaged are reduced to a minimum.

The present invention also makes it possible to insert connections into sockets with very high uncertainties of positions between the two pieces, connection-socket, which can even exceed the pitch of the sockets whenever some of them are situated on the same receiving case.

Another advantage of the present invention is that the same guiding, support and handling elements between the various pieces can be used regardless of the cross-section of the connection without the need for any alterations to any one of the elements.

Yet another advantage of the present invention is the simplicity of the resulting device, as well as its great adaptability and reliability.

Other advantages of the present invention could also be cited, but those mentioned above are already sufficient to show its novelty and interest.

The following description and drawings illustrate, non-restrictively, an embodiment of the invention. Other embodiments are possible from the accompanying claims which specify the extent and scope of the invention, for example by changing the purpose of the connections which are described essentially in their electrical application in the accompanying drawings.

FIG. 1 is a chronological diagram outlining the method according to the invention.

FIG. 2 is a plan view or bottom view of a connection case.

FIG. 3 is a cross-sectional view of an embodiment of electrical connection.

FIG. 1 shows cross-sectional illustrations of eight phases in a method for guiding a connection according to the invention, within a single plane x, z which is the plane of the figure, but it is possible to imagine the same process kinematics in the plane perpendicular to the figure.

The diagram illustrates the automatic introduction of a compatible male piece 1 into a female piece 2, of general cylindrical or prismatic shape of axis zz'; the two pieces are mounted on supports associated to known means permitting the displacement of the two pieces one with respect to the other, according to three orthonormal translation axes, one of which is parallel to zz' and constitutes the introduction axis.

The abovedescribed supports can be supports in which the female piece 2 is fixed, and then it is the male piece 1 which is mobile and displaced by its own support which, in the illustrated example, is a clamp 3.

Another possibility could be a displacement of the female piece 2 with respect to the male piece 1 which, in this case, would be fixed. Yet another possibility could be a combination of displacement of the two pieces, each one according to given axes as illustrated in FIG. 3.

Said male piece 1 is flexible in rotation about two axes other than the introduction axis and with respect to its support 3 and the device comprises a guide 4 in relative movement according to a plane (PP') perpendicular to the axis zz' above the socket 2 of the female piece, so as to cover part of the opening thereof, and when said male piece 1 is brought in abutment against said guide, said piece takes on an inclined position of a predetermined angle (α).

Phase 1 according to FIG. 1 shows the socket 2 brought by its support constituted of a table 9 in a theoretical fixed position of insertion with respect to a fixed location identification on the male piece 1.

The guide 4 is brought in the theoretical guiding position which is defined with respect to the relative play which the present guiding device is expected to make good, particularly so that said guide 4 partly covers the opening of the socket 2. The support 3, which may be the jaws of a clamp, holds the end of the male piece 1 which, in the case of an electrical connection, is the end of the wire carrying the connection 1.

The two male and female pieces are brought towards each other along axis zz' up to a given distance "d", in such a way that the end 5 of the male piece meets the plane PP' of the guide 4; then by a translatory movement according to one of the axes perpendicular to introduction axis zz', a carriage carrying the support 3 of the male piece 1 is moved along said axis xx'. As shown in phase 2 of FIG. 1, the stop position is such that the connection or male piece is brought to rest against the guide 4, causing the male piece 1 to bend according to its point of flexibility, which in this particular case is the free piece of wire 8 between the connection and the clamp support 3.

The value of the displacement in X according to axis xx' of the support carriage 3 will be predetermined as a function of the uncertainty of position of the connection 1 with respect to the retractable guide 4. It will be so calculated as to make sure that in every case, said connection 1 is in contact with the fixed guide 4 and that an optimum angle is obtained which is dependent on the value R of the quotient of the width L or of the diameter of the connection by the value J of the play between the connection and the socket: R=L/J; if R is high, the angle α is small, and if R is small, the angle α is big.

Then, according to phase 3 of FIG. 1, the support 3 is moved again along zz' so as to bring the end 5 of the connection to rest against the edge of the socket 2. The force producing this contact will be low enough not to bend the end 8 of the wire or damage said connection.

The order to stop can be given by a force sensor or any other means with possible sliding of the wire 8 in the support 3; which support can, for example, be determined so as to withstand a low force, of about 1 Newton, and to allow sliding for a force greater than about 10 Newtons.

The guide 4 is then retracted and the degree of freedom according to axis zz' of the support 3 is blocked by any means such as a brake and as illustrated by phase 4 in FIG. 1.

The carriage or support 3 is then moved, as shown in phase 5, according to axis xx' until the end 5 of the male piece 1 reaches a position in lateral abutment against the edge of the socket 2 as a result of its inclination as previously defined in the preceding phases.

The value of the displacement xx' of the support 3 is predetermined as a function of the uncertainty of position of the connection with respect to the socket. It will be calculated so as to make sure that in every case, the connection is in contact with the inner edge of the socket with the male piece 1 being inclined.

Then in phase 6, the support 3 is moved forward along zz' until a predetermined position is reached or until the connection 1 is wedged in the socket 2 if this occurs before said predetermined position is reached.

The strain caused by the displacement will be sufficiently low not to bend the end 5 of the wire 8 or to damage the connection proper. The predetermined position will be so defined as to make sure that, knowing the uncertainty of the position of the connection 1 with respect to the socket 2, the end 5 of the connection 1 comes into engagement in the socket 2.

Phase 7 consists in moving the support 3 and its translation carriage along xx' so as to bring the theoretical axes of introduction of the wire 8 and of its male piece 1 to coincide with the theoretical axis of introduction of the socket 2 along zz'.

Then the support 3 is moved along said axis zz' towards the socket 2 in order to insert the connection completely in said socket such as shown in phase 8. The thrusting pressure of support 3 along zz' will be such as to make sure that the connection is snap-engaged by any known pre-existing means 10 in the socket 10 and in the corresponding male piece 1.

FIG. 2 is a plan view or bottom view of a connection case for the automatic and successive introduction of a plurality of male pieces 1 in a case 7 comprising a plurality of female pieces 2 provided with openings facing the same direction and situated inside the same plane parallel to plane PP' controlling the displacement of the guide 4. The method permitting such introduction then consists in:

selecting an L-shaped guide 4, each branch of which is perpendicular to its two directions of translation xx' and yy', and of which one is sufficiently thin to be slipped in between two adjacent male pieces, once these have been inserted;

bringing said male pieces 1 by translation of the support 3 according to one of the main directions xx' and yy', which support is situated on the opening side of the branches of the guide 4 and perpendicular to the thin one 6;

beginning by inserting the first male piece 1 into the female piece situated in the outermost position of the case 7, and determined as being that situated inside an angle of which the apex is on the edge of said case and the two sides follow two perpendicular directions corresponding to that of the thin branch 6 of the guide 4 and to that along which the support 3 is brought;

then displacing the guide 4 along either one of the main directions xx' and yy' so as to insert the male pieces according to a line parallel to said direction, and shifting the guide in the main direction perpendicular to the direction initially selected for inserting other male pieces in the next row parallel to the first connected line.

In carrying out the abovedescribed method, in which two guiding axes xx' and yy' are proposed, the insertion is achieved by using the method defined in FIG. 1, simultaneously and/or successively, for each translation according to axis xx', using the same translation process as that used according to axis yy' perpendicular thereto in the same controlling plane as plane PP' of guide 4; however, the values of the translation according to axes xx' are not always the same: they are the same if pieces 1, 2 have symmetrical sections with respect to their axes, i.e. circular or square, but they are different when they have asymmetrical sections such as rectangular.

FIG. 3 is a cross-sectional view of an example of embodiment showing an electrical connection with the same characteristics as described with reference to the other figures, i.e. by way of a more detailed example of embodiment: a support or table 11 fixed in space or at least with respect to the fixing of male piece 1 and receiving a case 7 joined to said table and having for example a degree of freedom in translation according to axis yy' perpendicular to the figure.

Said case 7 comprises a number of female pieces 2 which are therefore provided with sockets into which the male piece 1 has to be connected. Said male piece or connection 1 is crimped on the end 8 of an electric wire which is itself fixed in the jaw 3 of a clamp 12, which latter is fixed on the end of a rod 14; said latter is rigidly joined to said clamp 12, movable with respect to a carriage 13 holding it in position, and has a degree of freedom of translation according to zz'. Said carriage 13 is joined to the chassis 11 and also has a degree of freedom of translation according to xx'.

There we find again the three degrees of freedom according to the three axes xx', yy', zz' which are necessary and described in the method used with the preceding device, but, in this case, each one of these axes is linked to only one of the means of the device, i.e. for axis xx', only the carriage 13, for axis zz' only the rod 14 holding the clamp 12 and for axis yy' the supports of the case 7 with respect to the fixed table 11. It is thus noted that the restriction of the movements to translations only, according to the three axes, simplifies to a maximum the different movements hence the design of the pieces necessary to the method and device according to the invention.

FIG. 3 also shows the guide 4 of which the displacements are achieved by any other known means for example according to axes yy' and xx'.

We claim:

1. Guiding method for the automatic introduction of a male piece into a female piece, said pieces being mounted on supports having means permitting displacement of said pieces with respect to each other, along three orthonormal axes of translation, one of which is parallel to an introduction axis (ZZ'), comprising the steps of:

mounting a flexible male piece for rotation about two other axes (XX' and YY') with respect to its support;

translating a guide along a plane (PP') perpendicular to the introduction axis (ZZ') to a location above a socket of a female piece having an opening, to cover a part of said opening, moving said male and female pieces along the introduction axis (ZZ') into closer proximity with each other, until an end of said male piece meets the plane (PP') in which the guide is translated;

translating said end along one of the said axes XX' or YY' perpendicular to said introduction axis (ZZ') until said end is abutted against said guide, such that said male piece is inclined at a predetermined angle;

moving said support and said male piece along said introduction axis to position said end in frontal abutment against an edge of said female piece;

retracting said guide;

translating said support and said male piece along the same said axes (XX' or YY') perpendicular to said introduction axis (Z) until an end of said male piece is brought into lateral abutment against an edge of said female piece;

moving said support and said male piece along said introduction axis until said male piece reaches a predetermined position in said female piece;

moving said support back along said perpendicular axis to bring said axes of introduction of said male and female pieces into coinciding position; and translating said support again along said axis of introduction to insert said male piece completely into said female piece.

2. Guiding method according to claim 1, further comprising, for each translation according to said axis (XX') perpendicular to said introduction axis (ZZ'), a simultaneous and same translation along the other perpendicular axis (YY') to the previous one (XX') in the plane (PP') of said guide.

3. Guiding method according to claim 2, wherein said translations are successive along each axis (XX') and (YY') perpendicular one to the other and to the introduction axis (ZZ').

4. Guiding method according to claim 1 for the automatic and successive introduction of a plurality of male pieces into a case having a plurality of female pieces, said female pieces having openings facing in a same direction and situated in a plane parallel to said plane (PP') along which said guide is translated, comprising the steps of:

selecting an L-shaped guide having branches perpendicular to its two directions of translation (XX' and YY') in the plane (PP'), one thin branch being sized to fit between two adjacent male pieces;

fitting said male pieces together;

moving said male pieces by translating along a main direction, said support of the flexible male pieces to be situated on an open side of said branches of said guide, perpendicular to said thin branch;

inserting a first male piece into a female piece disposed at an outermost position of said case, determined as being situated inside an angle having its apex in an edge of said case and its two sides following two perpendicular directions corresponding to a thin branch of said guide and to the direction along which said support is moved;

displacing said guide along a one of said translation direction perpendicular to the introduction axis to insert said male piece along a line parallel to said translation direction, and shifting said guide in the other translation direction perpendicular to said direction initially selected for other male pieces in a row parallel to a first connected line.

5. Guiding device for the automatic introduction of a male piece into a female piece, said pieces being mounted on supports, movement means for moving said supports with respect to each other along three orthonormal axes of translation, one of said axes being an introduction axis (ZZ'), said male piece being rotatable with respect to its support, a guide for guiding movement along a plane (PP') perpendicular to the axis (ZZ') above a socket of said female piece, said male piece being positioned to cover a part of said socket, said male piece disposed at a predetermined angle when abutted against said guide.

6. Guiding device according to claim 5, wherein said guide is L-shaped, each branch of said guide being perpendicular to two orthonormal reference axes of translation situated in said plane (PP').

7. Guiding device according to claim 6, further comprising a plurality of female pieces having openings facing in the same direction situated in a plane parallel to a plane controlling displacement of said guide, and a plurality of male pieces, each branch of said L-shaped guide being perpendicular each one to one of its two directions of translation and one of said branches is sufficiently thin to fit between two adjacent male pieces upon insertion, wherein said plurality of male pieces is introduced into said plurality of female pieces.

8. Guiding device according to claim 7, wherein said support is translated along one of said said translation directions perpendicular to the introduction axis, and is situated on a side of an L-shaped opening of the branches of the guide and perpendicular to a thin one.

9. A method for guiding a male connection piece attached to a flexible wire into a female piece, the pieces being mounted on first and second supports respectively that are movable with respect to each other along three orthonormal axes, where one of the axes (ZZ') is parallel to an introduction axis corresponding to a direction of insertion of the male piece into the female piece, the method comprising the steps of:

providing a guide movable in a direction perpendicular to the introduction axis;

gripping the flexible wire by the first support for flexible mounting of the male connection piece with respect to said first support;

moving said first support with respect to the guide in a direction perpendicular to the introduction axis until a defined position where the male connection piece abuts the guide and is at an angle ($\alpha$) different to its final angle when fully inserted into the female piece;

subsequently moving the first support with respect to the second support, removing the guide and inserting the male connection piece into the female piece.

10. A method according to claim 9, comprising the further steps of:

abutting an end of the male connection piece against a first edge of the female piece when subsequently moving the support with respect to the second support.

11. A method according to claim 9 wherein the guide has an L-shape for abutting the male connection piece.

12. A method according to claim 10, comprising the further steps of:

removing the guide from the male connection piece after the end of the male connection piece abuts the first edge of the female piece; and subsequently moving the first support with respect to the second support in a direction perpendicular to the introduction axis such that the end of the male connection piece is moved away from the first edge of the female piece.

13. A method according to claim 10 wherein the guide has an L-shape for abutting the male connection piece.

14. A method according to claim 12, comprising the further steps of:

abutting the male connection piece on a second edge of the female piece after moving it away from the first edge, where the first and second edges are arranged on opposing sides of the female piece.

15. A method according to claim 12 wherein the guide has an L-shape for abutting the male connection piece.

16. A method according to claim 14, comprising the further steps of:

subsequently aligning the flexible wire held in the first support with the introduction axis; and moving the first support with respect to the second support in the direction of the introduction axis thereby inserting the male connection piece into the female piece.

17. A method according to claim 14 wherein the guide has an L-shape for abutting the male connection piece.

18. A method according to claim 16 wherein the guide has an L-shape for abutting the male connection piece.

* * * * *